(12) United States Patent
Tan et al.

(10) Patent No.: US 11,342,764 B2
(45) Date of Patent: May 24, 2022

(54) LOW VOLTAGE CHARGING CONTROL AND PROTECTION CIRCUIT FOR ELECTRONIC CIGARETTE AND METHOD OF CHARGING THE ELECTRONIC CIGARETTE USING THE CIRCUIT

(71) Applicant: SHENZHEN INNOKIN TECHNOLOGY CO., LTD., Guangdong (CN)

(72) Inventors: Huimin Tan, Shenzhen (CN); Zhengzhan Peng, Shenzhen (CN)

(73) Assignee: SHENZHEN INNOKIN TECHNOLOGY CO., LTD., Shenzhen (CN)

( * ) Notice: Subject to any disclaimer, the term of this patent is extended or adjusted under 35 U.S.C. 154(b) by 140 days.

(21) Appl. No.: 16/697,360

(22) Filed: Nov. 27, 2019

(65) Prior Publication Data

US 2020/0169099 A1     May 28, 2020

(30) Foreign Application Priority Data

Nov. 28, 2018   (CN) .......................... 201821980470.9
Sep. 11, 2019   (CN) .......................... 201921513463.2

(51) Int. Cl.
    *H02J 7/00*       (2006.01)
    *A24F 40/90*    (2020.01)
    *A24F 40/95*    (2020.01)

(52) U.S. Cl.
    CPC ............ *H02J 7/0029* (2013.01); *A24F 40/90* (2020.01); *A24F 40/95* (2020.01); *H02J 7/007* (2013.01);

(Continued)

(58) Field of Classification Search
CPC ...... H02J 7/007; H02J 7/0029; H02J 7/00302; H02J 2207/40; H02J 7/0031; A24F 40/90; A24F 40/95

(Continued)

(56) References Cited

U.S. PATENT DOCUMENTS

2011/0267726 A1* 11/2011 Ikeuchi ................. H01M 10/48
                                                              361/63
2014/0360512 A1* 12/2014 Xiang ................... H02J 7/0077
                                                              131/328

(Continued)

FOREIGN PATENT DOCUMENTS

CN         204376494 U     6/2015
CN         105304962 A     2/2016

(Continued)

OTHER PUBLICATIONS

European Search Report issued in European application No. EP 19211973, dated Mar. 11, 2020 (3 pages).

(Continued)

*Primary Examiner* — Edward Tso
*Assistant Examiner* — Aaron Piggush
(74) *Attorney, Agent, or Firm* — Millburn IP PLLC

(57) ABSTRACT

A low voltage charging control and protection circuit for an electronic cigarette is provided. The circuit includes an extended charging circuit configured to charge a battery of the electronic cigarette at a first voltage. The circuit also includes a charging integrated circuit configured to charge the battery of the electronic cigarette at a second voltage. The first voltage is lower than the second voltage. The circuit further includes a microcontroller configured to control the extended charging circuit and the charging integrated circuit to alternately charge the battery of the electronic cigarette based on a high or low level of a voltage of the battery.

8 Claims, 2 Drawing Sheets

(52) U.S. Cl.
CPC ......... *H02J 7/0031* (2013.01); *H02J 7/00302* (2020.01); *H02J 2207/40* (2020.01)

(58) Field of Classification Search
USPC ......................... 320/111, 114, 136, 138, 162
See application file for complete search history.

(56) References Cited

U.S. PATENT DOCUMENTS

2015/0173124 A1* 6/2015 Qiu ....................... G06F 13/387
 131/328
2016/0204637 A1* 7/2016 Alarcon .................. A24F 40/85
 320/114

FOREIGN PATENT DOCUMENTS

| CN | 209016759 U | 6/2019 |
| EP | 2985854 A1 | 2/2016 |
| EP | 3007306 A1 | 4/2016 |

OTHER PUBLICATIONS

Extended European Search Report issued in European application No. EP 19211973, dated Mar. 20, 2020 (7 pages).

\* cited by examiner

LOW VOLTAGE CHARGING CONTROL AND PROTECTION CIRCUIT FOR ELECTRONIC CIGARETTE AND METHOD OF CHARGING THE ELECTRONIC CIGARETTE USING THE CIRCUIT

This patent application claims priority to Chinese Utility Model Application No. CN201821980470.9, filed on Nov. 28, 2018, and Chinese Utility Model Application No. CN201921513463.2, filed on Sep. 11, 2019, the entire contents of both of which are incorporated herein by reference.

TECHNICAL FIELD

The present disclosure relates to a low voltage charging control and protection circuit, and more specifically, to a low voltage charging control and protection circuit for an electronic cigarette, the electronic cigarette that includes the low voltage charging control and protection circuit, and a method of charging the electronic cigarette based on the low voltage charging control and protection circuit.

BACKGROUND

One type of electronic cigarette that is currently available in the market includes an atomizer, an electronic cigarette liquid ("E-liquid") storage tank, a battery, and a control assembly. The battery is electrically connected with the control assembly. The battery typically includes an electrical core, which may be directly charged and used repeatedly for multiple times. When the electronic cigarette is stored and not used for a long time, the electrical charge stored in the battery can be exhausted, and the electrical core can be overly discharged. Because the charging capacity of the integrated circuit ("IC") at 0 V is at about a 100 mA charging current, the electrical core cannot be charged or after charging for a long time (e.g., 3-5 hours) the electrical core may still not be fully charged. As a result, the battery cannot be charged normally, and the electronic cigarette cannot be used. In addition, the electronic cigarette may be thrown away because the electrical core cannot be awakened (i.e., charged), which can be a waste of resources, and can add a lot of pressure to the environment.

Furthermore, in a normal use process of the electrical core of the battery, multiple times of repeated charging and discharging it typical. However, because the electrical core of the battery is in a low voltage state while being used, for protection of the electrical core of the battery, the electrical core of the battery may automatically shut down, no longer providing the electrical power. However, due to some human reasons, for example, the smoker needs to smoke at this moment, the user may forcefully start up the electrical core of the battery, causing the electrical core of the battery to continue discharging to provide electrical energy to the atomizer. The electrical core of the battery continuing to provide the electrical energy under the low voltage condition is an unsafe operation that is not a recommended use. In particular, after the electrical core of the battery has been overly discharged for multiple times, safety related issues (e.g., swelling, fluid leakage, etc.) may occur to the electrical core of the battery. If the electrical core is continuingly used, other safe issues may occur. Therefore, how to ensure the electrical energy is used to a maximum degree while enhancing the safety performance of the electrical core of the electrical battery, thereby reducing the waste of the product caused by an unintended operation has become an emerging issue to address.

SUMMARY

The objective of the present disclosure is to overcome the defects in the conventional technologies. A low voltage battery charging control and protection circuit for an electronic cigarette is provided. The circuit has features such as charging at a low voltage or even zero voltage, over-discharging proof, and improved safety performance.

The present disclosure may be realized as follows: a low voltage battery charging control and protection circuit, including: an extended charging circuit configured to charge the battery at a first voltage, a charging integrated circuit configured to charge the battery at a second voltage, the first voltage being lower than the second voltage, and a microcontroller configured to control the extended charging circuit and the charging integrated circuit to alternately charge the battery until the battery is fully charged based on the high or low level of the voltage of the battery.

An embodiment of the present disclosure provides a low voltage battery charging control and protection circuit, which includes an extended charging circuit and a charging integrated circuit that are independently and separately disposed or configured. The extended charging circuit is disposed external to the charging integrated circuit, and hence is also referred to as an external extended charging circuit.

The external extended charging circuit may be configured to connect with a first external power source, and may include:

a first transistor including a first base, a first collector, and a first emitter. The first collector may be connected with the first external power source through a first resistor. The first base may be connected with the first external power source through a second resistor. The first emitter may be connected with a first charging port of the battery. A second charging port of the battery may be connected to the ground.

a second transistor including a second base, a second collector, and a second emitter. The second collector may be connected with the first base. The second collector may be connected to the ground through a voltage regulator tube. The second emitter may be connected with the ground. The second emitter and the second base may be connected through a third resistor. The second base may be connected with the microcontroller.

The charging integrated circuit may be configured to connect a second external power source, and may include:

a charging interface configured to connect a charging port of the battery of the electronic cigarette, and an input port configured to connect a positive terminal of the second external power source. A negative terminal of the second external power source may be connected with the ground. The charging interface of the charging integrated circuit may be connected with the ground through a third capacitor.

The positive terminal and the negative terminal of the second external power source may be connected through a second capacitor.

In some embodiments, the battery of the electronic cigarette may be a 5V battery. The first external power source and the second external power source may both be 5V power sources, such as USB 5V external power sources, or may be two different output ports of a same 5V external power source.

Another objective of the present disclosure is to overcome the defects in the conventional technologies. The present disclosure provides an electronic cigarette having a low voltage battery charging control and protection circuit and a method of charging the battery of the electronic cigarette based on the low voltage battery charging control and protection circuit.

The present disclosure provides an electronic cigarette having a low voltage battery charging control and protection circuit.

The electronic cigarette may include an atomizer, an E-liquid storage tank, a battery having an electrical core, and a control assembly including an integrated circuit and a controller (e.g., a microcontroller). The battery may be connected with the control assembly. The control assembly may be connected with the atomizer. The E-liquid storage tank may be configured to provide an E-liquid to the atomizer. In some embodiments, the control assembly may include the low voltage battery charging control and protection circuit.

The method and principle of charging the electronic cigarette based on the low voltage battery charging control and protection circuit may include:

Step 1: connecting an external extended charging circuit with a first external power source; and controlling, by the microcontroller, the external extended charging circuit to charge a battery of an electronic cigarette through the first external power source, wherein the first external power source charges the battery of the electronic cigarette through a first transistor of the external extended charging circuit, Step 2: connecting an input port of a charging integrated circuit with a second external power source; and controlling, by the microcontroller, the external extended charging circuit and the charging integrated circuit to charge the battery of the electronic cigarette in parallel.

Step 3: after the battery has been charged to arrive at a predetermined voltage, controlling, by the microcontroller, a second transistor of the external extended charging circuit to operate to forcefully pull down the voltage of the first transistor to terminate the operation of the first transistor (and hence terminate the charging of the battery by the external extended charging circuit); and controlling, by the microcontroller, the charging integrated circuit to charge the battery through the second external power source until the battery is fully charged or is charged to a predetermined voltage level.

At an initial state of charging the battery of the electronic cigarette based on the disclosed low voltage battery charging control and protection circuit, the charging integrated circuit may not charge the battery and the battery may only be charged by the external extended charging circuit. For example, the first external power source may charge the battery of the electronic cigarette at a 5V voltage through the first transistor of the external extended charging circuit. After the battery is charged to reach a predetermined voltage, the microcontroller may control the second transistor of the external extended charging circuit to operate to forcefully reduce the voltage of the first transistor to terminate the operation of the first transistor (and hence terminating the charging by the external extended charging circuit). The microcontroller may control a chip of the charging integrated circuit IC to charge the battery through the second external power source, until the battery is fully charged or is charged to a predetermined voltage level.

In some embodiments, the present disclosure provides a low voltage battery charging control and protection circuit, which may include an extended charging circuit and a charging integrated circuit that are integrally configured. The extended charging circuit may be configured to charge the battery at a first voltage, and the charging integrated circuit may be configured to charge the battery at a second voltage. The first voltage may be lower than the second voltage. The extended charging circuit and the charging integrated circuit may be controlled by the microcontroller to alternately charge the battery based on the high or low level of the voltage of the battery until the battery is fully charged or is charged to a predetermined voltage level.

In some embodiments, the integrally configured extended charging circuit and the charging integrated circuit may include:

a power source port connected with an input port of the charging integrated circuit. The power source port may also be connected with a microcontroller through a voltage regulator module or voltage regulator tube. The microcontroller may be connected with an enabling pin of the charging integrated circuit. The enabling pin of the charging integrated circuit may be connected with the ground through a pull-down resistor;

a first transistor including a first base, a first collector, and a first emitter. The first collector may be connected with a first node. The first node may be connected with the power source port through a first resistor. The first node and the first base may be connected with a second resistor. The first emitter may be connected with a second node. The second node may be connected with an output port of the charging integrated circuit;

a second transistor including a second base, a second collector, and a second emitter. The second collector may be connected with the first base. The second base may be connected with the microcontroller through a third resistor. The second emitter may be connected with the ground;

a third transistor including a third base, a third collector, and a third emitter. The third emitter may be connected with a third node. The third node may be connected with the microcontroller through a fourth resistor. The third node may be connected with the ground through a fifth resistor. The third collector may be connected with the ground. The third emitter may be connected with a fourth node. The fourth node may be connected with the power source port through a sixth resistor.

a fourth transistor including a fourth base, a fourth collector, and a fourth emitter. The fourth base may be connected with the fourth node. The fourth collector may be connected with the second node. The fourth emitter may be connected with a fifth node. The fifth node may be connected with a sixth node through a seventh resistor. The sixth node may be connected with the microcontroller. The sixth node may also be connected with the ground through an eighth resistor; and a battery interface having a positive terminal connected with the fifth node, and a negative terminal connected with the ground.

In some embodiments, the first transistor, the second transistor, and the fourth transistor may all be NPN types, and the third transistor may be a PNP type.

In some embodiments, the microcontroller may be connected with a seventh node. The seventh node may be connected with the enabling pin of the charging integrated circuit. The seventh node may also be connected with the ground through a pull-down resistor.

In some embodiments, the first base and the second collector may be connected through an eighth node. The first node and the eighth node may be connected through the second resistor.

The present disclosure provides an electronic cigarette having a low voltage battery charging control and protection circuit.

The electronic cigarette may include an atomizer, an E-liquid storage tank, a battery, and a control assembly. The battery may be connected with the control assembly. The control assembly may be connected with the atomizer. The E-liquid storage tank may be configured to provide the E-liquid to the atomizer. In some embodiments, an electrical core may be disposed in an interior of the battery. The control assembly may include the low voltage battery charging control and protection circuit disclosed herein.

The technical solutions of the present disclosure realizes normal low voltage charging of the electrical core of the battery, and effectively ensures that the electrical core of the battery cannot continue to be charged and used after the electrical core has been overly discharged at a low voltage for a predetermined number of times, thereby ensuring that the electrical core is in a state in which the electrical core cannot be charged, to avoid the occurrence of an accident.

BRIEF DESCRIPTION OF THE DRAWINGS

To better explain the technical solutions of the present disclosure and of the conventional technologies, the accompany drawings that are referred to when describing the present disclosure or the conventional technologies will be briefly introduced. Obviously, the accompanying drawings described below are only some embodiments of the present disclosure. A person having ordinary skills in the art can derive other drawings based on these drawings without creative labor.

DETAILED DESCRIPTION OF THE EMBODIMENTS

The technical solution of the embodiments of the present disclosure will be described in detail with reference to the accompanying drawings. The described embodiments are merely some embodiments of the present disclosure, and are not all embodiments of the present disclosure. Based on the embodiments of the present disclosure, a person having ordinary skills in the art can obtain other embodiments without creative labor. Such embodiments all fall within the scope of protection of the present disclosure.

Figure 1:
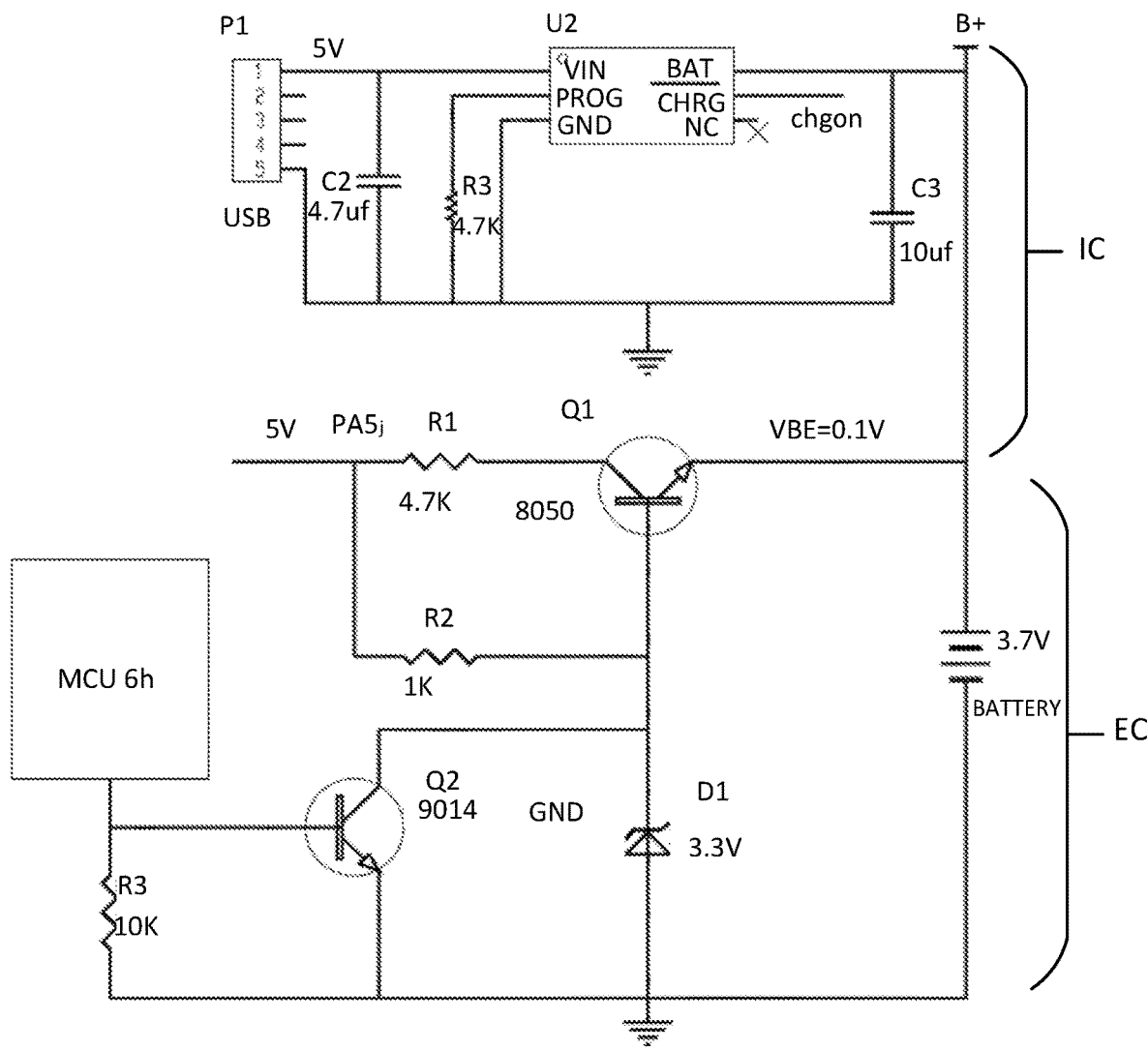
FIG. 1 is a schematic illustration of the principle of a circuit according to an embodiment of the present disclosure.

As shown in FIG. 1, an embodiment of the present disclosure provides a low voltage battery charging control and protection circuit for an electronic cigarette. The circuit may include an external extended charging circuit EC. The external extended charging circuit may include: a first transistor Q1, which may include a first base, a first collector, and a first emitter. The first collector may be connected with a first external power source through a first resistor R1. The first base may be connected with the first external power source through a second resistor R2. The first emitter may be connected with a first charging port of the battery of the electronic cigarette. A second charging port of the battery of the electronic cigarette may be connected with the ground. The external extended charging circuit may also include a second transistor Q2, which may include a second base, a second collector, and a second emitter. The second collector may be connected with the first base. The second collector may also be connected with the ground through a voltage regulator tube D1. The second emitter may be connected with the ground. The second emitter and the second base may be connected through a third resistor R3. The second base may be connected with a microcontroller MCU. The low voltage battery charging control and protection circuit may also include a charging integrated circuit IC configured to connect with a second external power source. The charging integrated circuit IC may include a charging interface configured to connect with the first charging port of the battery of the electronic cigarette, and an input port configured to connect with a positive terminal of the second external power source. The negative terminal of the second external power source may be connected with the ground. The charging interface of the charging integrated circuit IC may be connected with the ground through a third capacitor C3. The positive terminal and the negative terminal of the second external power source may be connected through a second capacitor C2.

In some embodiments, the battery of the electronic cigarette may be a 5V battery. In some embodiments, the first external power source and the second external power source may both be 5V power sources, such as, for example, USB 5V external power sources, or two different output ports of a same 5V external power sources.

Another objective of the present disclosure is to overcome the defects of the conventional technologies. The present disclosure provides an electronic cigarette having the disclosed low voltage battery charging control and protection circuit, and a method of charging the electronic cigarette based on the disclosed circuit.

The present disclosure provides an electronic cigarette having a low voltage battery charging control and protection circuit.

The electronic cigarette may include an atomizer, an E-liquid storage tank, a battery, and a control assembly. The battery may be connected with the control assembly. The control assembly may be connected with the atomizer. The E-liquid storage tank may be configured to provide the E-liquid to the atomizer. In some embodiments, an electrical core may be disposed in the interior of the battery. The control assembly may include the disclosed low voltage battery charging control and protection circuit.

The method and principle of charging the electronic cigarette based on the circuit with the above disclosed separated external extended charging circuit EC and charging integrated circuit IC may include:

Step 1: connecting an external extended charging circuit with a first external power source; and controlling, by the microcontroller, the external extended charging circuit to charge a battery of an electronic cigarette, wherein the first external power source charges the battery of the electronic cigarette first through a first transistor of the external extended charging circuit, Step 2: connecting an input port of a charging integrated circuit IC with a second external power source; and controlling, by the microcontroller, the external extended charging circuit and the charging integrated circuit to charge the battery of the electronic cigarette in parallel, Step 3: after the battery is charged to a predetermined voltage, controlling, by the microcontroller MCU, a second transistor of the external extended charging circuit to operate to forcefully pull down the voltage of the first transistor of the external extended charging circuit to terminate the operation of the first transistor (and hence terminate the charging of the battery by the external extended charging circuit); and controlling, by the microcontroller, the charging integrated circuit IC to charge the battery through the second external power source until the battery is fully charged or is charged to a predetermined voltage level.

The principle of charging the battery through the external extended charging circuit may be described as following:

The input port of the charging integrated circuit IC may be connected with a USB 5V power source, which may be configured to be in parallel with the external extended charging circuit. A typical charging circuit needs to have a voltage of 2.8V or more in order to provide normal charging. Therefore, according to the present disclosure, when the voltage of the electrical core of the battery of the electronic cigarette is below 3.6V, an emitter follower newly added in the external extended charging circuit may start to operate. The first 5V external power source (represented by "5V" shown next to "R1" in FIG. 1) connected with the external extended charging circuit ("EC" shown in FIG. 1) may be applied to the positive terminal of the electrical core through R1, Q1, to charge the electrical core. When the voltage of the electrical core is increased to 3.6V, because Q1 loses a bias voltage, the external extended charging circuit stops operating. The charging time of this period may be about 30 seconds. Thereafter, the charging integrated circuit IC may maintain normal operations to charge the battery until the battery is fully charged or is charged to a predetermined voltage level.

In some embodiments, the external extended charging circuit may start charging the battery under the control of the microcontroller MCU in two modes.

a. when the voltage of the battery is relatively low (e.g., 2.8V, then the microcontroller MCU can operate normally), because the trickle current of the charging integrated circuit is relatively small, the microcontroller MCU may set the current transfer ratio ("CTR") pin to be in a low state. At this time, the external extended charging circuit starts the charging action.

b. the voltage of the battery has been statically discharged to be overly low, and the microcontroller MCU does not respond. At this time, because of the pull-down resistor, the CTR pin may be in a low state, the external extended charging circuit may also perform the charging actions.

The charging of the present disclosure can be understood as: at an initial state of charging the electronic cigarette based on the disclosed low voltage battery charging control and protection circuit, the charging integrate circuit IC may not charge the battery. The first external power source may charge the battery of the electronic cigarette first through the first transistor Q1 of the external extended charging circuit. After the battery has been charged to a predetermined voltage, the microcontroller MCU may control the second transistor Q2 of the external extended charging circuit to operate to forcefully pull down the voltage of the first transistor Q1 to terminate the operation of the first transistor (and hence to terminate the charging of the battery by the external extended charging circuit). The charging integrated circuit IC may start to charge the battery until the battery is fully charged or is charged to a predetermined voltage level.

Figure 2:
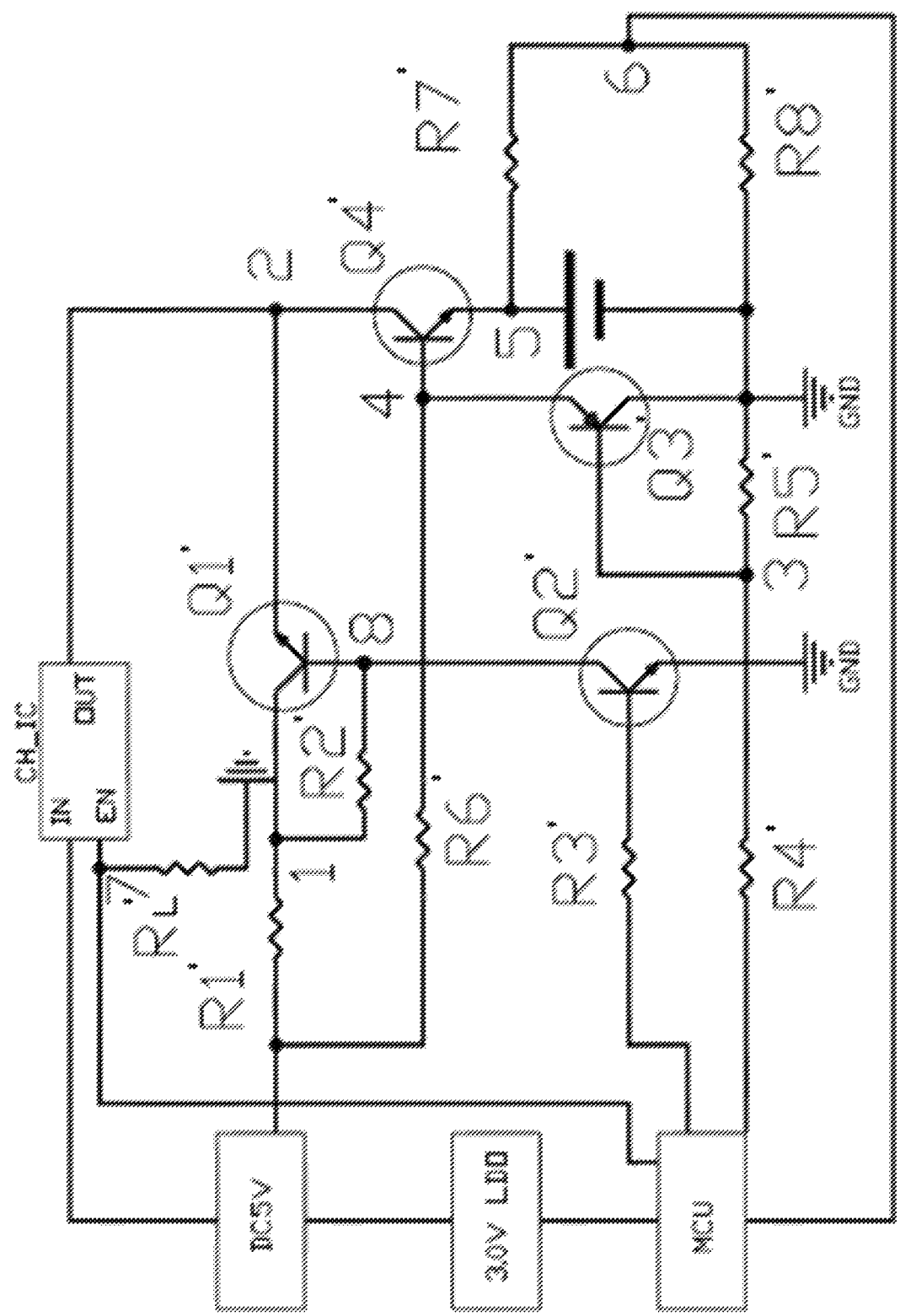
FIG. 2 is a schematic illustration of the principle of a circuit according to another embodiment of the present disclosure.

As shown in FIG. 2, an embodiment of the present disclosure provides a low voltage battery charging control and protection circuit. The circuit may include an extended charging circuit and a charging integrated circuit that are integrally configured or formed. The extended charging circuit may be configured to charge the battery at a first voltage. The charging integrated circuit may be configured to charge the battery at a second voltage. The first voltage may be lower than the second voltage. The extended charging circuit and the charging integrated circuit may be controlled by the microcontroller to alternately charge the battery based on the high or low level of the voltage of the battery until the battery is fully charged or is charged to a predetermined voltage level.

In some embodiments, when the extended charging circuit and the charging integrated circuit are integrally configured, the low voltage battery charging control and protection circuit may not structurally distinguish the extended charging circuit from the charging integrated circuit, but may merely functionally divide the extended charging circuit and the charging integrated circuit. That is, except for the microcontroller MCU, a circuit portion that charges the battery at the first voltage may be regarded as a portion of an extended charging circuit, and a circuit portion that charges the battery at the second voltage may be regarded as a portion of a charging integrated circuit.

In some embodiments, the integrated low voltage battery charging control and protection circuit may include:

a power source port configured to be connected with an input port of a charging integrated circuit IC. The power source port may also be connected with a microcontroller MCU through a voltage regulator module or voltage regulator tube. The microcontroller MCU may be connected with an enabling pin of the charging integrated circuit IC. The enabling pin of the charging integrated circuit IC may also be connected with the ground through a pull-down resistor RL;

a first transistor Q1', which may include a first base, a first collector, and a first emitter. The first collector may be connected with a first node 1. The first node 1 may be connected with the power source port through a first resistor R1'. The first node 1 and the first base may be connected through a second resistor R2'. The first emitter may be connected with a second node 2. The second node 2 may be connected with an output port of the charging integrated circuit IC;

a second transistor Q2', which may include a second base, a second collector, and a second emitter. The second collector may be connected with the first base. The second base may be connected with the microcontroller MCU through a third resistor R3'. The second emitter may be connected with the ground;

a third transistor Q3', which may include a third base, a third collector, and a third emitter. The third base may be connected with a third node 3. The third node 3 may be connected with the microcontroller MCU through a fourth resistor R4'. The third node 3 may be connected with the ground through a fifth resistor R5'. The third collector may be connected with the ground. The third emitter may be connected with a fourth node 4. The fourth node 4 may be connected with the power source port through a sixth resistor R6'.

a fourth transistor Q4', which may include a fourth base, a fourth collector, and a fourth emitter. The fourth base may be connected with the fourth node 4. The fourth collector may be connected with the second node 2. The fourth emitter may be connected with a fifth node 5. The fifth node 5 may be connected with a sixth node 6 through a seventh resistor R7'. The sixth node 6 may be connected with the microcontroller MCU. The sixth node 6 may be connected with the ground through an eighth resistor R8'; and a battery interface including a positive terminal connected with the fifth node, and a negative terminal connected with the ground. The battery interface is briefly described. It may be understood as a place for assembling the electrical core, or may be a converting interface of the electrical core, or may be a direct connector for the electrical core.

In some embodiments, the first transistor Q1', the second transistor Q2', and the fourth transistor Q4' may all be NPN types, and the third transistor Q3' may be a PNP type.

In some embodiments, the microcontroller MCU may be connected with the seventh node 7. The seventh node 7 may be connected with the enabling pin of the charging integrated circuit IC. The seventh node 7 may be connected with the ground through a pull down resistor.

In some embodiments, the first base and the second collector may be connected with the eighth node 8. The first node 1 and the eight node 8 may be connected through the second resistor R2'.

The present disclosure provides an electronic cigarette having a low voltage battery charging control and protection circuit.

The electronic cigarette may include an atomizer, an E-liquid storage tank, a battery, and a control assembly. The battery may be connected with the control assembly. The control assembly may be connected with the atomizer. The E-liquid storage tank may be configured to provide the E-liquid to the atomizer. In some embodiments, an electrical core may be provided in the interior of the battery. The control assembly may include the disclosed low voltage battery charging control and protection circuit.

The method and principle of charging the electronic cigarette based on the disclosed circuit may include:

Step 1: providing an electrical power to initialize a microcontroller MCU of a low voltage battery charging control and protection circuit;

Step 2: detecting, through the microcontroller MCU, a voltage at a positive terminal of an electrical core of a battery and controlling the charging of the electrical core of the battery based on the detected voltage, if the detected voltage of the electrical core of the battery is lower than 2.5V, controlling, by the microcontroller, the extended charging circuit to charge the electrical core of the battery with an external power source through the first transistor Q1' and the fourth transistor Q4' of the extended charging circuit, if the detected voltage of the electrical core of the battery is at least 3.3V, controlling, by the microcontroller, the charging integrated circuit IC to charge the electrical core of the battery with the external power source.

In some embodiments, providing the electrical power to initialize the microcontroller MCU of the low voltage battery charging control and protection circuit may be realized as follows:

The electrical core may be placed at the battery interface. First, a power source may be connected through a USB 5V interface. At this moment, the microcontroller MCU may be reset. Each of the third transistor Q3' and the second transistor Q2' may become conductive (e.g., be in a connected state in the circuit). Specifically, the microcontroller MCU may output a low voltage to the base of the third transistor Q3' through the fourth resistor R4' and the third node 3. The third transistor Q3' may become conductive, thereby further pulling down the voltage of the fourth node 4 to be 0V or to be substantially 0V. It does not necessarily to reduce the voltage to be 0, as long as the voltage is reduced to a level that is sufficiently low to disconnect, switch off, or disable the fourth transistor Q4'. The microcontroller MCU may output a high voltage to the base of the second transistor Q2'. The second transistor Q2' may become conductive, thereby pulling down the voltage of the eighth node 8 to be 0V or to be substantially 0V. The first transistor may become disconnected or switched off. The positive terminal of the battery interface may be connected with the fifth node 5. The fifth node 5 may not have a voltage or a current. Thus, the battery may be in a charging-blocked state. The enabling pin EN of the charging integrated circuit IC may be at a high enabling state. The high enabling state may be understood as, when there is a high voltage signal, the charging integrated circuit IC may start, and charging is enabled; when there is no high voltage signal, the charging integrated circuit IC may not operate, and may be in a waiting state. At this moment, there is no high-enabling signal provided by the microcontroller MCU. That is, the seventh node 7 may be stably set to be in a low state through the pull-down resistor RL. At this moment, the charging integrated circuit IC may be in a non-charging state. Thus, the battery may be in a non-charging state. The dry cell symbol in FIG. 2 represents the electrical core.

In some embodiments, detecting, through the microcontroller MCU, a voltage at a positive terminal of the electrical core of the battery and charging the electrical core of the battery may be realized as follows: after the electrical power is provided to microcontroller MCU to initialize the microcontroller MCU, the microcontroller MCU may detect a voltage at the fifth node 5 through the seventh resistor R7'. At this moment, the voltage at the fifth node 5 may be equal to the voltage at the positive terminal of the electrical core. If the detected voltage of the electrical core is lower than 2.5V, because no high voltage signal is provided to the enabling pin EN of the charging integrated circuit IC, the enabling pin EN of the charging integrated circuit IC may be set to be in a low state by the pull-down resistor RL. The microcontroller MCU may output a high voltage through the fourth resistor R4', to disconnect the third transistor R3'. The voltage at the fourth node 4 may increase, and the fourth transistor Q4' may become connected. A low voltage may be output through the fourth resistor R4', and the second transistor Q2' may be disconnected. The voltage at the eighth node 8 may increase. The first transistor Q1' may become conductive. At this moment, the power source may charge the electrical core through the first transistor Q1' and the fourth transistor Q4'. When the microcontroller MCU detects that the voltage of the electrical core is at least 3.3V, the microcontroller MCU may set the enabling pin EN of the charging integrated circuit IC to be high. At this moment, the charging integrated circuit IC may be in an enabled state, and may output a high voltage through the fourth resistor R4'. The third transistor Q3' may be disconnected. The fourth transistor Q4' may become conductive. A high voltage may be output through the third resistor R3'. The second transistor Q2' may become conductive. The first transistor Q1' may become disconnected. At this moment, the power source may output a voltage and/or a current through an output port OUT of the charging integrated circuit IC, which may pass through the second node 2, the fourth transistor Q4', to arrive at the fifth node 5 to charge the electrical core.

In some embodiments, the microcontroller of the low voltage battery charging control and protection circuit may be configured to automatically record a number of charging times after a low voltage discharge, calculate an accumulated total number of charging times (i.e., counts), and store the accumulated total number of charging times. When the accumulated total number of charging times after the low voltage discharge exceeds a predetermined number, the microcontroller may shut down the low voltage battery charging control and protection circuit to ensure that the battery is no longer charged and used.

The method of charging the electronic cigarette based on the disclosed circuit may also include protecting the battery based on a number of the low voltage charging times. The protection also includes disabling the charging and hence the use of the battery after the number of the low voltage charging times has exceeded a predetermined value.

Specifically, in some embodiments, the microcontroller MCU may automatically record a number of the low voltage charging times after a low voltage discharge and may store an accumulated total number of the low voltage charging times. The low voltage discharge is briefly described as follows. When the electrical core has a voltage lower than a predetermined voltage, the electrical core needs to be protected from further use, and should not be operated to continue to output the electrical energy. However, at this moment, if the user forcefully starts the electrical core to release the remaining electrical energy, such a use the electrical core is regarded as a low voltage discharge, which is an abnormal or unintended use. Such low voltage discharge, which is an abnormal use, should be avoided as much as possible, because it may shorten the lifetime of the electrical core.

Using the method of charging the electronic cigarette with integrated extended charging circuit EC and the charging integrated circuit IC as an example, when the external power source is connected to provide charging, and when the electrical core is charged at a voltage lower than a predetermined voltage and when the accumulated total number of charging times of the low voltage charging has reached a predetermined number, e.g., 10 times, then when charging at the $11^{th}$ time, after the microcontroller MCU is provided with the electrical power, the enabling pin EN of the charging integrated circuit may be set to be low, i.e., to be in a non-enabling state. In the meantime, a high voltage may be output through the third resistor R3' to connect the second transistor Q2', and to disconnect or switch off the first transistor Q1' synchronously. A low voltage may be output through the fourth resistor R4 to make the third transistor Q3' conductive and to synchronously disconnect or switch off the fourth transistor Q4', such that the circuit is in a shutdown state, ensuring that the battery can no longer be charged and used. The example accumulated total number of charging times, 10 times, is merely one example. The accumulated total number of charging times may be set as N, where N is a positive integer.

By charging protection through calculating an accumulated total number of low voltage charging times and storing the accumulated total number, the electrical core can be protected by effectively ensuring that the electrical core cannot be charged and used after the electrical core has been overly discharged at a low voltage for a predetermined number of times.

Through shutting down the charging integrated circuit IC, the first transistor Q1', and the fourth transistor Q4', the electrical core can be effectively ensured to be in a non-charging state, avoiding the occurrence of an accident. Such an overly discharged electrical core will no longer be charged, and will not be used.

The above descriptions merely describe some embodiments of the present disclosure, and are not intended to limit the present disclosure. Any modification, equivalent substitution, and improvement made within the spirit and principle of the present disclosure all fall within the scope of protection of the present disclosure.

What is claimed is:

1. A low voltage charging control and protection circuit for an electronic cigarette, comprising:

an extended charging circuit configured to charge a battery of the electronic cigarette at a first voltage;

a charging integrated circuit configured to charge the battery of the electronic cigarette at a second voltage, wherein the first voltage is lower than the second voltage; and a microcontroller configured to control the extended charging circuit and the charging integrated circuit to alternately charge the battery of the electronic cigarette based on a high or low level of a voltage of the battery, wherein the extended charging circuit and the charging integrated circuit are structurally integrally configured, wherein in functions, except for the microcontroller, a circuit portion configured to charge the battery of the electronic cigarette at the first voltage is a portion of the extended charging circuit, and a circuit portion configured to charge the battery of the electronic cigarette at the second voltage is a portion of the charging integrated circuit, and wherein the low voltage charging control and protection circuit further comprises:

a power source port configured to connect with an input port of the charging integrated circuit, and connect with the microcontroller through a voltage regulator module, wherein the microcontroller is connected with an enabling pin of the charging integrated circuit, and the enabling pin of the charging integrated circuit is connected with the ground through a pull-down resistor;

a first transistor including a first base, a first collector, and a first emitter, wherein the first collector is connected with a first node, the first node is connected with the power source port through a first resistor, the first node and the first base are connected through a second resistor, the first emitter is connected with a second node, and the second node is connected with an output port of the charging integrated circuit;

a second transistor including a second base, a second collector, and a second emitter, wherein the second collector is connected with the first base, the second base is connected with the microcontroller through a third resistor, and the second emitter is connected with the ground;

a third transistor including a third base, a third collector, and a third emitter, wherein the third base is connected with a third node, the third node is connected with the microcontroller through a fourth resistor, the third node is also connected with the ground through a fifth resistor, the third collector is connected with the ground, the third emitter is connected with a fourth node, and the fourth node is connected with the power source port through a sixth resistor;

a fourth transistor including a fourth base, a fourth collector, and a fourth emitter, the fourth base is connected with the fourth node, the fourth collector is connected with the second node, the fourth emitter is connected with a fifth node, the fifth node is connected with a sixth node through a seventh resistor, the sixth node is connected with the microcontroller, and the sixth node is connected with the ground through an eighth resistor; and a battery interface including a positive terminal connected with the fifth node, and a negative terminal connected with the ground.

2. The low voltage charging control and protection circuit of claim 1, wherein the microcontroller is configured to:

record a number of charging times after a low voltage discharge, calculate an accumulated total number of charging times, and store the accumulated total number of charging times; and disable charging of the battery by the extended charging circuit and the charging integrated circuit when the accumulated total number of charging times after the low voltage discharge exceeds a predetermined number.

3. The low voltage charging control and protection circuit of claim 2, wherein the battery of the electronic cigarette is a 5V battery.

4. The low voltage charging control and protection circuit of claim 1, wherein the first transistor, the second transistor, and the fourth transistor are all NPN types, and the third transistor is a PNP type.

5. An electronic cigarette, comprising:

an atomizer;

an E-liquid storage tank;

a battery; and a control assembly, wherein the battery is connected with the control assembly, the control assembly is connected with the atomizer, and the E-liquid storage tank is configured to provide an E-liquid to the atomizer, wherein the control assembly includes a low voltage charging control and protection circuit, and wherein the low voltage charging control and protection circuit includes:

an extended charging circuit configured to charge the battery at a first voltage;

a charging integrated circuit configured to charge the battery at a second voltage, wherein the first voltage is lower than the second voltage; and a microcontroller configured to control the extended charging circuit and the charging integrated circuit to alternately charge the battery based on a high or low level of a voltage of the battery, wherein the extended charging circuit and the charging integrated circuit are structurally integrally configured, wherein in functions, except for the microcontroller, a circuit portion configured to charge the battery of the electronic cigarette at the first voltage is a portion of the extended charging circuit, and a circuit portion configured to charge the battery of the electronic cigarette at the second voltage is a portion of the charging integrated circuit, and wherein the low voltage charging control and protection circuit further includes:

a power source port configured to connect with an input port of the charging integrated circuit, and connect with the microcontroller through a voltage regulator module, wherein the microcontroller is connected with an enabling pin of the charging integrated circuit, and the enabling pin of the charging integrated circuit is connected with the ground through a pull-down resistor;

a first transistor including a first base, a first collector, and a first emitter, wherein the first collector is connected with a first node, the first node is connected with the power source port through a first resistor, the first node and the first base are connected through a second resistor, the first emitter is connected with a second node, and the second node is connected with an output port of the charging integrated circuit;

a second transistor including a second base, a second collector, and a second emitter, wherein the second collector is connected with the first base, the second base is connected with the microcontroller through a third resistor, and the second emitter is connected with the ground;

a third transistor including a third base, a third collector, and a third emitter, wherein the third base is connected with a third node, the third node is connected with the microcontroller through a fourth resistor, the third node is also connected with the ground through a fifth resistor, the third collector is connected with the ground, the third emitter is connected with a fourth node, and the fourth node is connected with the power source port through a sixth resistor;

a fourth transistor including a fourth base, a fourth collector, and a fourth emitter, the fourth base is connected with the fourth node, the fourth collector is connected with the second node, the fourth emitter is connected with a fifth node, the fifth node is connected with a sixth node through a seventh resistor, the sixth node is connected with the microcontroller, and the sixth node is connected with the ground through an eighth resistor, and a battery interface including a positive terminal connected with the fifth node, and a negative terminal connected with the ground.

6. The electronic cigarette of claim 5, wherein the microcontroller is configured to:

record a number of charging times after a low voltage discharge, calculate an accumulated total number of charging times, and store the accumulated total number of charging times, and disable charging of the battery by the extended charging circuit and the charging integrated circuit when the accumulated total number of charging times after the low voltage discharge exceeds a predetermined number.

7. The electronic cigarette of claim 5, wherein the first transistor, the second transistor, and the fourth transistor are all NPN types, and the third transistor is a PNP type.

8. The electronic cigarette of claim 6, wherein the battery of the electronic cigarette is a 5V battery.

* * * * *